US011208270B1

(12) United States Patent
Sewart et al.

(10) Patent No.: US 11,208,270 B1
(45) Date of Patent: Dec. 28, 2021

(54) SYSTEMS AND METHODS FOR SCANNING AND DIMENSIONING ITEMS IN MOTION

(71) Applicant: Amazon Technologies, Inc., Seattle, WA (US)

(72) Inventors: Gordon Sewart, Tacoma, WA (US); Steven Bradley Buhr, Tacoma, WA (US); John Mac Brown, Shelton, WA (US); Joseph Bastian Olsen, Tacoma, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/022,609

(22) Filed: Sep. 16, 2020

(51) Int. Cl.
*B65G 43/08* (2006.01)
*B65G 1/137* (2006.01)

(52) U.S. Cl.
CPC ........... *B65G 43/08* (2013.01); *B65G 1/1373* (2013.01); *B65G 2203/0283* (2013.01); *B65G 2203/0291* (2013.01); *B65G 2203/041* (2013.01)

(58) Field of Classification Search
CPC .... B65G 37/02; B65G 47/503; B65G 47/502; B65G 47/681; B65G 43/08; B65G 2203/0233; B07C 3/003; B07C 3/00; B07C 3/02; B07C 3/006; G05B 19/4189; G05B 2219/45054
See application file for complete search history.

(56) References Cited

U.S. PATENT DOCUMENTS 10,625,952 B1 * 4/2020 Luthra ................. B65G 37/005
2014/0142746 A1 * 5/2014 Vegh ....................... B65G 47/34
700/229

FOREIGN PATENT DOCUMENTS

CN 108413873 A * 8/2018

OTHER PUBLICATIONS

CN-108413873-A.*

* cited by examiner

*Primary Examiner* — Gene O Crawford
*Assistant Examiner* — Lester III Rushin
(74) *Attorney, Agent, or Firm* — Eversheds Sutherland (US) LLP

(57) ABSTRACT

Systems, methods, and computer-readable media are disclosed for scanning and dimensioning items in motion. In one embodiment, an example system may include a first camera oriented along a vertical axis towards a gap between a first surface and a second surface, a first light emitting array positioned to emit light towards the gap, and a first light receiving array aligned with the light emitting array and configured to detect the light. The first light emitting array and the first light receiving array may be offset from the vertical axis, and the system may be configured to determine a first dimension of an item passing over the gap using the first light emitting array and the first light receiving array.

20 Claims, 7 Drawing Sheets

SYSTEMS AND METHODS FOR SCANNING AND DIMENSIONING ITEMS IN MOTION

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. For example, use of robotic equipment to move or otherwise handle objects may improve efficiency. However, such robotic equipment may have difficulty completing certain tasks. Accordingly, improvements in various operations of order fulfillment, such as improvements to picking technology, sorting technology, packing technology, and so forth may be desired, such that manual efforts can be redirected to different tasks.

Figure 1:
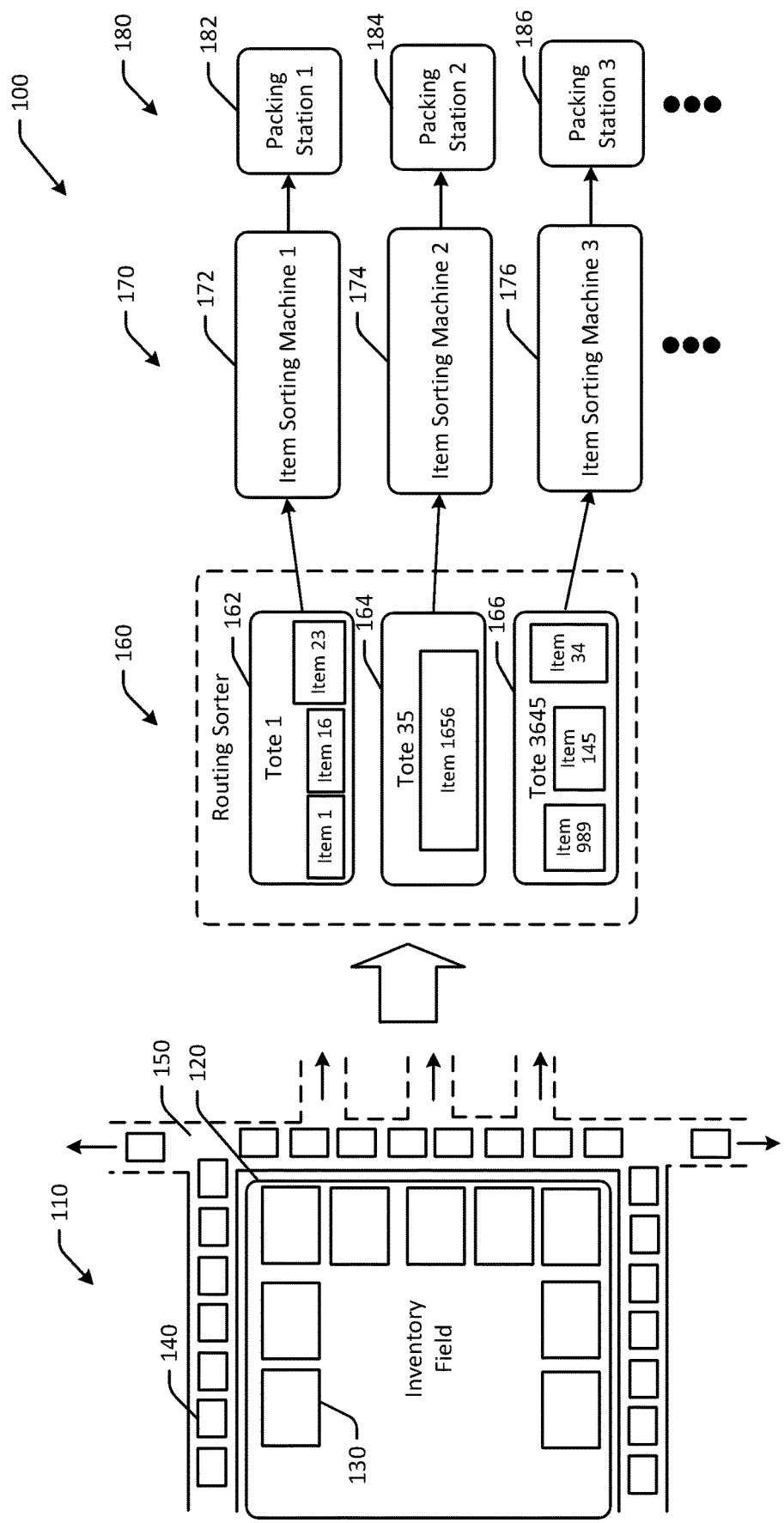
FIG. 1 is a hybrid schematic illustration of an example use case for scanning and dimensioning items in motion in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with. Humans may be able to manually handle individual items with ease. However, robotic handling of individual items may require various levels of dexterity. In addition, items may need to be measured and/or identified at various stages of processing. For example, if an item is to be packed into a custom-sized carton, the item may need to be measured to determine the dimensions of the carton in which the item is to be placed.

Measuring items may take time and create bottlenecks. To avoid this, embodiments allow for items to be measured while in motion. Moreover, items may need to be identified at various stages of processing to determine where an item should be directed to, determine an order the item is associated with, and so forth. Embodiments allow for items to identified at or near the same time as the item is measured using one or more cameras configured to scan a machine readable code associated with the item. Accordingly, embodiments may be used to identify and measure (or dimension) items while the items are in motion.

In one embodiment, a system may include a combination of one or more scanning cameras and item dimensioning light arrays in a compact space. The system may be used in various automated fulfillment processes in which dimensioning and/or measurement of an item is needed, in addition to identification of the item, such as by scanning or detecting a machine readable code. The system may be used to identify and measure items while the item is in motion on one or more conveyor belts. Identification of items in motion may be difficult because an identifier, such as a barcode, may be on a bottom surface of the item and may therefore not be visible or accessible for scanning. To address this issue, the system may include one or more cameras disposed below a gap between two surfaces, such as two conveyor belts. As the item passes over the gap, the camera may scan the machine readable code. In addition, as the item passes over the gap, the system may include a light emitting array and a light receiving array configured to measure or dimension a length or a width of the item. Combining both the scanning camera(s) and the light arrays in a compact space may be difficult due to the physical space requirements, as well as the fact that a larger gap between the surfaces may be needed. However, gaps larger than 0.25 inches or about 0.5 inches may introduce pinch points or other hazards as items pass over the gap, and in some instances, small items can fall through the gap and may be difficult to recover. In some embodiments, gaps can be kept to less than 0.25 inches or greater than 4 inches to avoid pinch points. However, gaps between 0.25 inches and 4 inches may be problematic, depending on the location of the gap and the objects passing over. Embodiments avoid this issue by providing scanning and dimensioning equipment in a compact footprint that does not need large gaps between surfaces, and in some instances can operate with a gap of about 0.25 inches between surfaces, while providing the ability to produce correctly dimensioned cartons or other containers in which to pack the item(s).

Embodiments of the disclosure include methods and systems for scanning and dimensioning items in motion that may improve processing and fulfillment of orders, or other object aggregation tasks. Certain embodiments include systems with one or more pairs of light arrays used to dimension items in motion, and one or more cameras used to identify items in motion. Some embodiments include optimized process flows for processing of orders at fulfillment centers, as well as process flows or methods to increase speed of consolidating products in a single or multi-item order as a result of improved speed of identifying or dimensioning items. As a result, throughput of fulfillment centers may be improved, and/or logistics of fulfillment center operations may be less complicated.

Referring to FIG. 1, an example use case 100 for scanning and dimensioning items in motion and an example process flow in accordance with one or more embodiments of the disclosure. Although discussed in the context of online orders, other embodiments may be directed to any suitable use case where objects are dimensioned and identified, such as instances where objects are picked from inventory, placed into containers, removed from containers for sorting, and so forth.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. For example, systems as described herein may be used to measure and identify objects as the objects are removed from inventory containers, transported, packed, and so forth. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include scanning and dimensioning items in motion, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where measurement and/or identification of items is used, such as to pick items from inventory, place items in totes, remove items from totes, place items into bins, remove items from bins, place items into boxes for shipping, and so forth, scanning and dimensioning items in motion systems and methods as described herein may be used. As a result, manual effort can be redirected to other tasks.

Embodiments of the disclosure include systems and methods for scanning and dimensioning items in motion. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
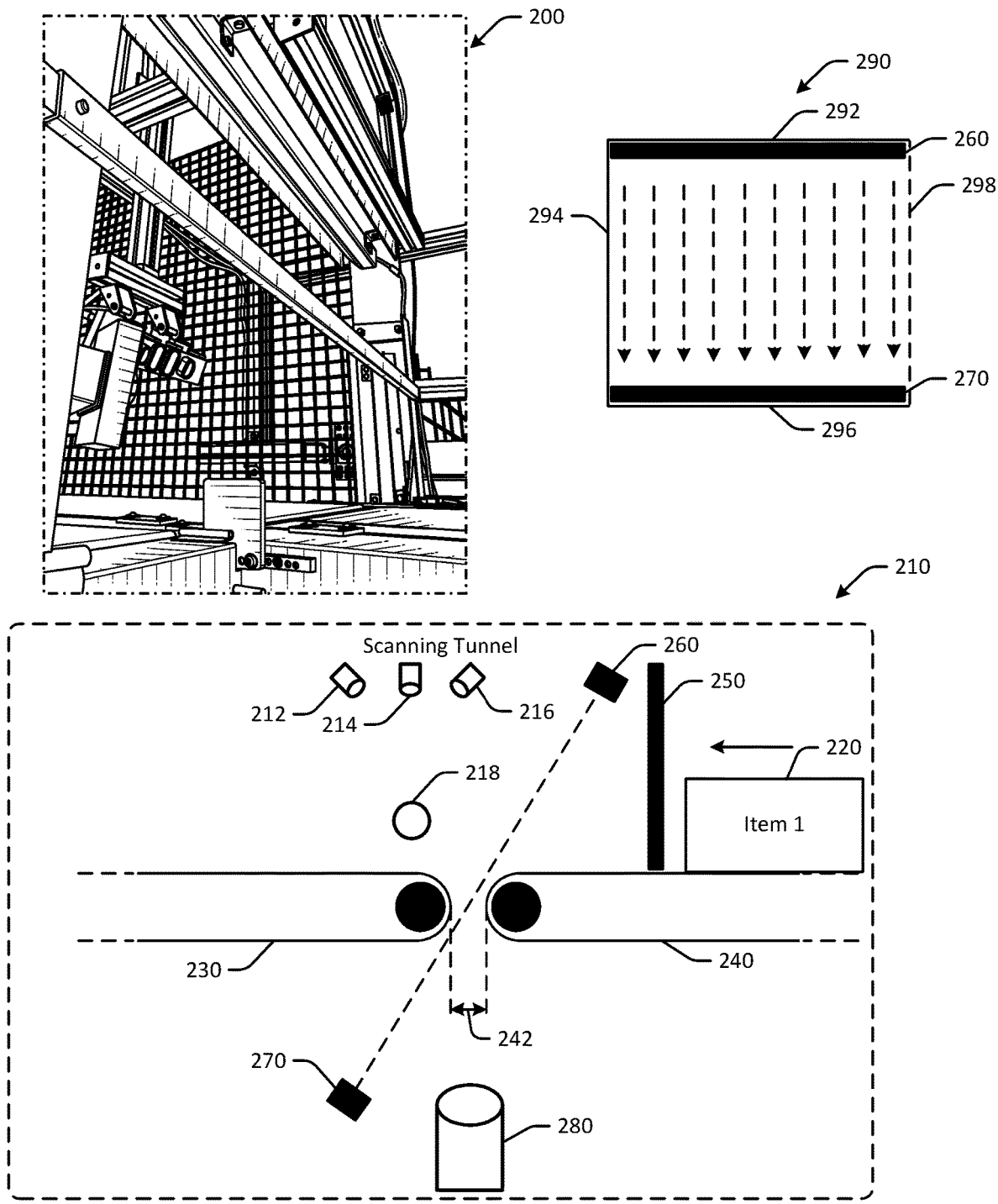
FIG. 2 is a schematic illustration of an example system for scanning and dimensioning items in motion in accordance with one or more embodiments of the disclosure.

FIG. 2 is a schematic illustration of an example system 200 for scanning and dimensioning items in motion in accordance with one or more embodiments of the disclosure. Other embodiments may include additional or fewer components. The illustration of FIG. 2 may not be to scale, and may not be illustrated to scale with respect to other figures.

In FIG. 2, portions of a system for scanning and dimensioning items in motion are schematically depicted. The system may include a combination of one or more scanning cameras and item dimensioning light arrays in a compact space. The system may be used in various automated fulfillment processes in which dimensioning and/or measurement of an item is needed, in addition to identification of the item, such as by scanning or detecting a machine readable code. The system may be used to identify and measure items while the item is in motion on one or more conveyor belts (e.g., as the items pass over a gap between surfaces or conveyors, etc.).

In schematic illustration 210, the system may be disposed in a scanning tunnel. An item 220 may pass through the scanning tunnel and be dimensioned and identified as it moves through the scanning tunnel. Specifically, the item 220 may move along a first conveyor 240, over a gap 242, and onto a second conveyor 230. The first conveyor 240 and the second conveyor 230 may move at the same speed or at different speeds. The conveyors may be conveyor belts or other moving surfaces. The gap 242 may be equal to or less than about ¼ inch.

A number of cameras may be disposed in the scanning tunnel. In some embodiments, one or more of the cameras may be part of the system, whereas in other embodiments, some of the cameras may be part of a different system, such as the scanning tunnel system. In the illustration of FIG. 2, the cameras may include a first set of one or more cameras that includes a first camera 214 configured to image an upper portion of the item 220, a second camera 212 configured to image a front face of the item 220, and a third camera 216 configured to image a rear face of the item 220. In some embodiments, additional or fewer cameras may be included in the first set of cameras, and the cameras may have different orientations than those illustrated in the example of FIG. 2. The scanning tunnel and/or the system may include a second set of one or more cameras 218 configured to image a first side of the item 220, where the second set of cameras 218 is disposed about a first side of the first conveyor 240 or the second conveyor 230. A third set of one or more cameras may be disposed opposite the second set of cameras 218 and may be configured to image a second side of the item 220, where the third set of cameras is disposed about a second side of the first conveyor 240 or the second conveyor 230. A fourth set of one or more cameras 280 may be configured to image a lower portion of the item 220, where the fourth set of cameras 280 is disposed below the gap 242. One or more of the cameras may be part of the system for scanning and dimensioning the item 220 in motion. The cameras may be used to scan and/or identify the item 220.

The system may include one or more light emitting arrays and one or more light receiving arrays. Each pair of light arrays may be aligned and disposed in the scanning tunnel, and may be used to measure or dimension the item 220 as it moves through the tunnel and/or passes over the gap 242. For example, a first pair of light arrays may include a first light emitting array 250 and a light receiving array disposed on an opposite side of the first conveyor 240. The light emitting array 250 may emit light that is received by the corresponding light receiving array. Interruption of the light may be used as a signal to calculate or otherwise determine a dimension of the item 220. For example, a height of the item 220 may be determined based on a portion of the light that is interrupted when the item 220 passes between the first light emitting array 250 and the corresponding light receiving array. Accordingly, the first light emitting array 250 and the corresponding light receiving array may be vertically oriented. In other embodiments, the first light emitting array may be disposed on the opposite side, the that light receiving array may be positioned at 250 in the illustrated example. The vertical light array may be optional in some embodiments.

The system may include another pair of light arrays. As illustrated in FIG. 2, the system may include a second light emitting array 260 and a corresponding second light receiving array 270 (or vice versa, in that the arrays may be swapped such that the light receiving array 260 is disposed above the gap 242). The second light emitting array 260 and the second light receiving array 270 may extend across a width of the conveyors, or laterally across a length of the gap 242 (e.g., out of the page, etc.). However, the second light emitting array 260 and the second light receiving array 270 may not be oriented along a vertical axis, as typically arranged. Instead, the second light emitting array 260 and the second light receiving array 270 may be offset, or in some instances rotated about, a vertical axis extending through a center of the gap 242 by up to about 5 degrees, up to about 10 degrees, up to about 15 degrees, and so forth. As a result, the second light emitting array 260 and the second light receiving array 270 may be offset from the vertical axis by up to about 2 inches or another value. The second light emitting array 260 may be disposed adjacent to the first set of cameras 212, 214, 216, and the second light receiving array 270 may be disposed adjacent to the fourth set of cameras 280, such that at least a portion of light emitted by the light emitting array 260 propagates through the gap 242 and is received by the light receiving array 270. The second light emitting array 260 and the second light receiving array 270 may be used to determine a length (or width) of the item 220 measured from a front face to a rear face of the item 220 as it passes between the second light emitting array 260 and the second light receiving array 270.

Due to the offset arrangement of the second light emitting array 260 and the second light receiving array 270, the entire system may be fit into a compact format without a large gap between the conveyors, and may provide both scanning and measurement functionality while the item 220 remains in motion. Embodiments also provide space for the lower scanning camera (e.g., camera 280) to be disposed directly under the gap 242, without having to have the light receiving array 270 disposed adjacent to the camera 280 and oriented along the vertical axis, thereby providing a more compact footprint and improved safety.

However, as a result of the offset arrangement, error may be introduced into the measurement value determined using the second light emitting array 260 and the second light receiving array 270. To address this error, an error modifier value may be determined and applied to the measured value, as discussed with respect to at least FIGS. 3 and 5.

As depicted in top view 290, the second light emitting array 260 and the second light receiving array 270 may be coupled together to ensure alignment of the emitting and receiving faces, and to decrease difficulty of assembly and/or retrofitting. The second light emitting array 260 and the second light receiving array 270 may be coupled using a U-shaped bracket formed of a first member 292, a second member 294, and a third member 296. Some embodiments may use a rectangular shaped bracket formed of the first member 292, the second member 294, the third member 296, and an optional fourth member 298 for added rigidity. Emitted light may travel in the direction illustrated by the arrows in the top view 290.

The system may therefore be configured to identify the item 220 by scanning a barcode or other machine readable code using one or more of the first set of cameras, the second set of cameras, the third set of cameras, or the fourth set of cameras, and the system may further be configured to measure at least one dimension of the item using the second light emitting array 260 and the second light receiving array 270.

Figure 3:
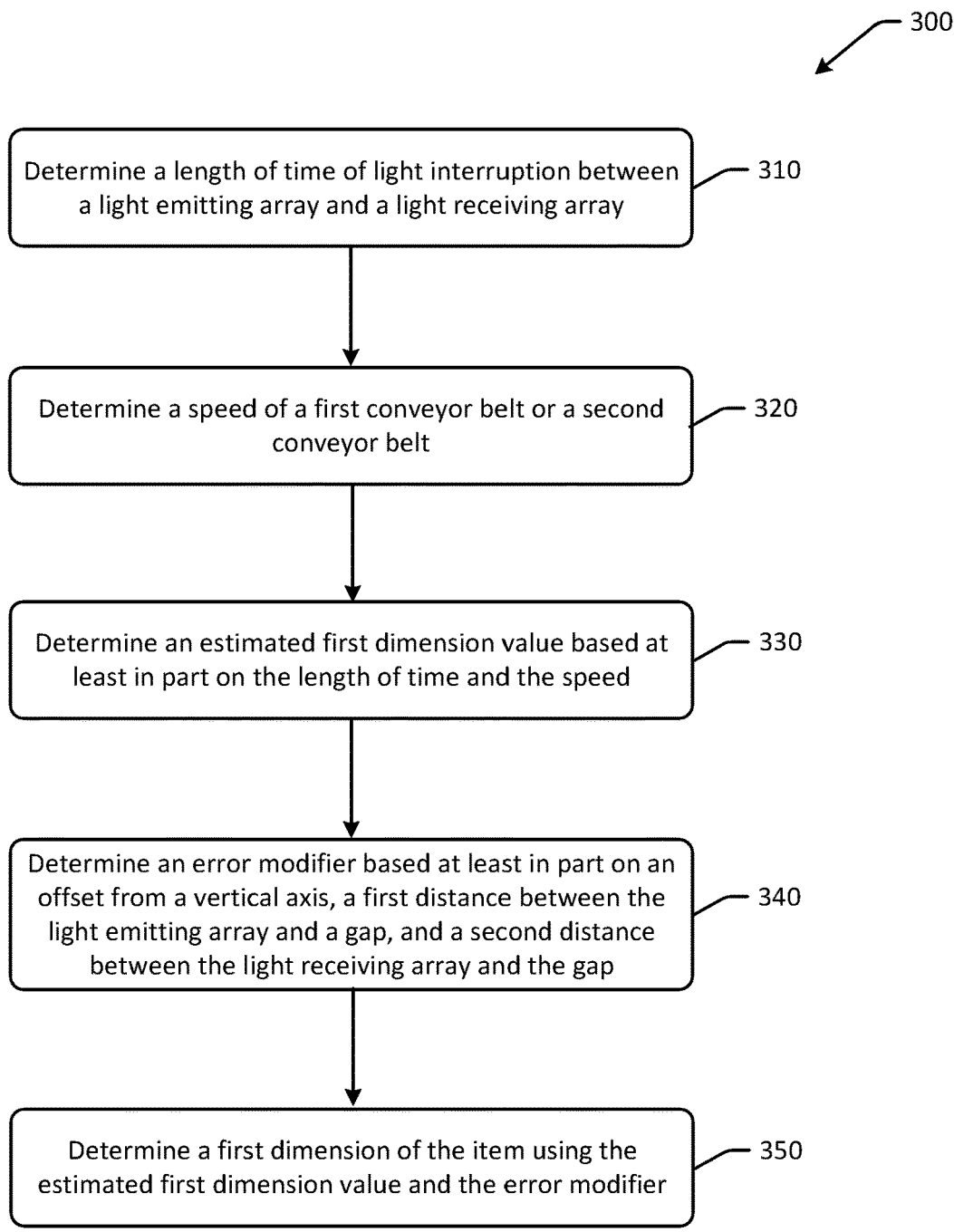
FIG. 3 is an example process flow for scanning and dimensioning items in motion in accordance with one or more embodiments of the disclosure.

FIG. 3 is a schematic illustration of an example process flow 300 for scanning and dimensioning items in motion in accordance with one or more embodiments of the disclosure. Other embodiments may include additional or fewer operations. The process flow 300 may be performed by one or more computer systems, such as a controller coupled to one or more light array assemblies. One or more operations may be performed at least partially concurrently and/or in a different order than that depicted in the example of FIG. 3.

At block 310 of the process flow 300, a length of time of light interruption between a light emitting array and a light receiving array may be determined. For example, a system for scanning and dimensioning items in motion may include one or more light emitting arrays and one or more light receiving arrays. The light emitting array may be configured to output light, and the light receiving array may be configured to receive at least a portion of the light output by the light emitting array. As an item passes between the light emitting array and the light receiving array, the light may be interrupted and the light receiving array may not receive light emitted by the light emitting array. The length of time of light interruption may be used as a signal to determine a dimension of the item, such as a length of the item. For example, the amount or length of time the light was interrupted may be used in conjunction with a speed at which the item was moving to determine a length of the item. To determine the length of time of interruption, a controller in communication with the light receiving array may initiate a counter or timer after an interruption is detected, and may stop the counter or timer after the interruption ceases and/or the light receiving array receives light again. In some embodiments, an interruption may have a minimum length before a timer or counter is initiated, such as a number of milliseconds.

At block 320, a speed of the first conveyor belt or the second conveyor belt may be determined. For example, the speed of the first conveyor belt and/or the second conveyor belt may be used as a proxy to determine a speed of the item at the time of the light interruption. The speed of the first conveyor belt or the second conveyor belt may be determined via communication with a conveyor controller, or may be a preset static value. The first conveyor belt and the second conveyor belt may move at the same speed in some instances. In an example embodiment, the controller may determine the speed of the first conveyor belt or the second conveyor belt by querying a conveyor system controller.

At block 330, an estimated first dimension value may be determined based at least in part on the length of time and the speed. For example, the controller may determine the estimated first dimension value by performing any necessary unit conversions and multiplying the values. For example, if the speed of the first conveyor belt is 3 inches per second, and the time of interruption is 2 seconds, the item may be determined to have an estimated first dimension value of 6 inches. The 6 inch value may be determined to be a length or a width depending on orientation of the item, and may be set to a default setting of a measurement of length.

At block 340, an error modifier may be determined based at least in part on an offset from the vertical axis, a first distance between the light emitting array and a gap between the first conveyor and the second conveyor, and a second distance between the light receiving array and the gap. For example, the light emitting array and the light receiving array may not be vertically aligned or aligned with a vertical axis. Instead, the light emitting array and the light receiving array may be offset from the vertical axis. In one example, the light emitting array and the light receiving array may be rotated from the vertical axis by an angular value of about 4 degrees, or about 5 degrees, or about 6 degrees, or about 7 degrees, or about 10 degrees, or about 15 degrees. The angular value may be the offset from the vertical axis, and the actual distance between the vertical axis and the light emitting array and/or the light receiving array may be a horizontal distance of about 2 inches or a different distance. The first distance may be the distance between the light emitting array and a gap between the first conveyor and the second conveyor. The second distance may be the distance between the light receiving array and the gap. The first distance and the second distance may be non-equal or different. The offset, the first distance, and the second distance may be static values and may be input at the controller or otherwise detected by the controller during use. The error modifier may account for a discrepancy in dimensional measurement detected using the light emitting array and the light receiving array due to the offset from the vertical axis. For example, detected measurements may be slightly larger than actual values due to the offset. To determine the error modifier, in one example, the controller may determine an inverse tangent value of the offset distance divided by the vertical distance of the light emitting array from the gap (if disposed above the gap, or else the light receiving array if disposed above the gap). The error modifier may be a fixed adjustment value, such as, in one example, minus 1 inch for an offset of 7 degree rotation from the vertical axis. In other embodiments, the error modifier could be a positive fixed adjustment value.

At block 350, a first dimension of the item may be determined using the estimated first dimension value and the error modifier. For example, if the estimated first dimension value is 6 inches, and the error modifier is −1 inch, the controller may determine the first dimension of the item to be 5 inches.

Accordingly, the first dimension of the item may be accurately determined as the item passes in motion over a gap between the first conveyor and the second conveyor, or other first surface and second surface, using the process flow 300. One or more cameras, such as barcode scanning cameras, may be disposed about the gap, including underneath the gap, and can be used to identify the item, such as by scanning or otherwise visualizing a machine-readable code on the item. The process flow 300 may therefore be executed to scan and dimension items in motion.

Figure 4:
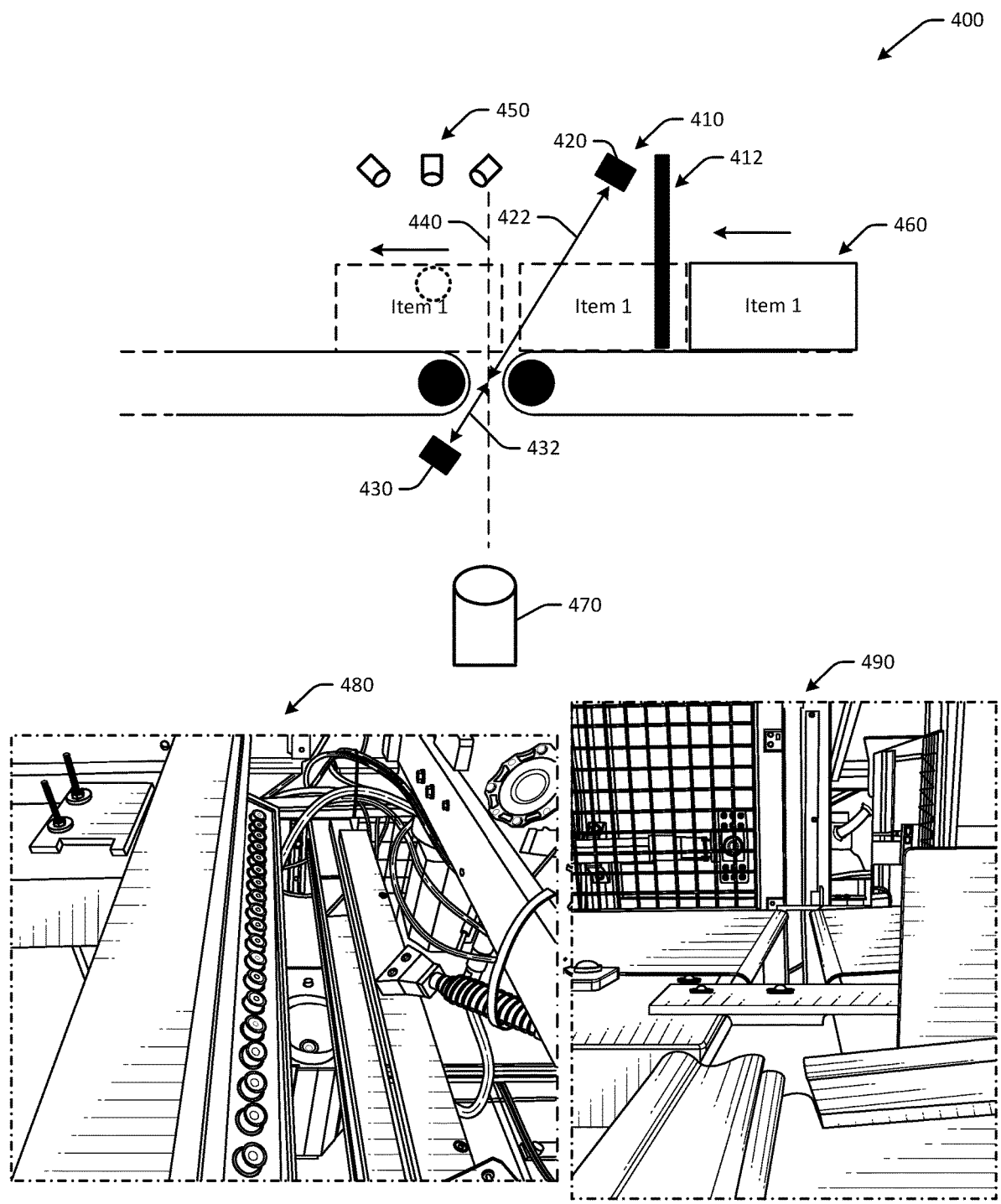
FIG. 4 is a schematic illustration of an item in motion at a system for scanning and dimensioning items while in motion in accordance with one or more embodiments of the disclosure.

FIG. 4 is a schematic illustration of an item in motion at a system 400 for scanning and dimensioning items while in motion in accordance with one or more embodiments of the disclosure. Other embodiments may include additional or fewer components. The illustration of FIG. 4 is not to scale, and may not be illustrated to scale with respect to other figures. The system illustrated in FIG. 4 may be the same scanning and dimensioning items in motion system discussed with respect to FIGS. 1-3, but with a different spacing between the angled light arrays.

In FIG. 4, the system may include a first camera 470 oriented along a vertical axis 440 towards a gap between a first surface and a second surface. The gap is illustrated in detail view 490. The first camera 470 may be disposed on a lower side of the gap, and may therefore be configured to image a lower portion or bottom surface of an item 460 as the item 460 passes over the gap. Performance of the first camera 470 may be improved due to the orthogonal positioning of the first camera 470 with respect to the vertical axis 440 and/or the parallel planar positioning of the first camera 470 with respect to the bottom surface of the item 460.

The system may include a pair of angled light arrays 410 having a first light emitting array 420 and a first light receiving array 430. The first light emitting array 420 may be positioned to emit light towards the gap, and the first light receiving array 430 may be aligned with the light emitting array 420 and configured to detect the light. The first light emitting array 420 may be disposed on an upper side of the gap, and the first light receiving array 430 may be disposed on a lower side of the gap, or the opposite arrangement may be used.

The first light emitting array 420 may be separated from the gap by a first distance 422. The first light receiving array 430 may be separated from the gap by a second distance 432. The second distance 432 may be greater than or less than the first distance 422. In addition, the first light receiving array 430 may be placed above the gap, and the first light emitting array 420 may be placed below the gap in a different embodiment. Further, the angled light arrays 410 may be rotated in the opposite direction relative to the vertical axis 440 in other embodiments. The angled light arrays 410 may be offset from the vertical axis 440 by about 4 degrees, about 5 degrees, about 6 degrees, about 7 degrees, or another amount. The maximum amount of rotation may depend on a vertical distance between the light emitting array 420 and the gap. As illustrated in detail view 480, the light receiving array 430 may be disposed closer to the gap than the first camera 470.

The system may include a second set of cameras 450 disposed along an upper portion of the first surface, and a third camera disposed along a first side of the first surface. Some embodiments may include a fourth camera disposed along a second side of the first surface.

In some embodiments, the system may include a pair of vertical light arrays 412 that may be used to determine a height of the item 460, as well as to determine a length (or width) of the item 460 as determined in the direction of travel.

Accordingly, some embodiments may have non-uniform distances between the light emitting array 420 and the light receiving array 430, which may provide added flexibility for configuration, and may provide reduced footprint and utilize less space.

Figure 5:
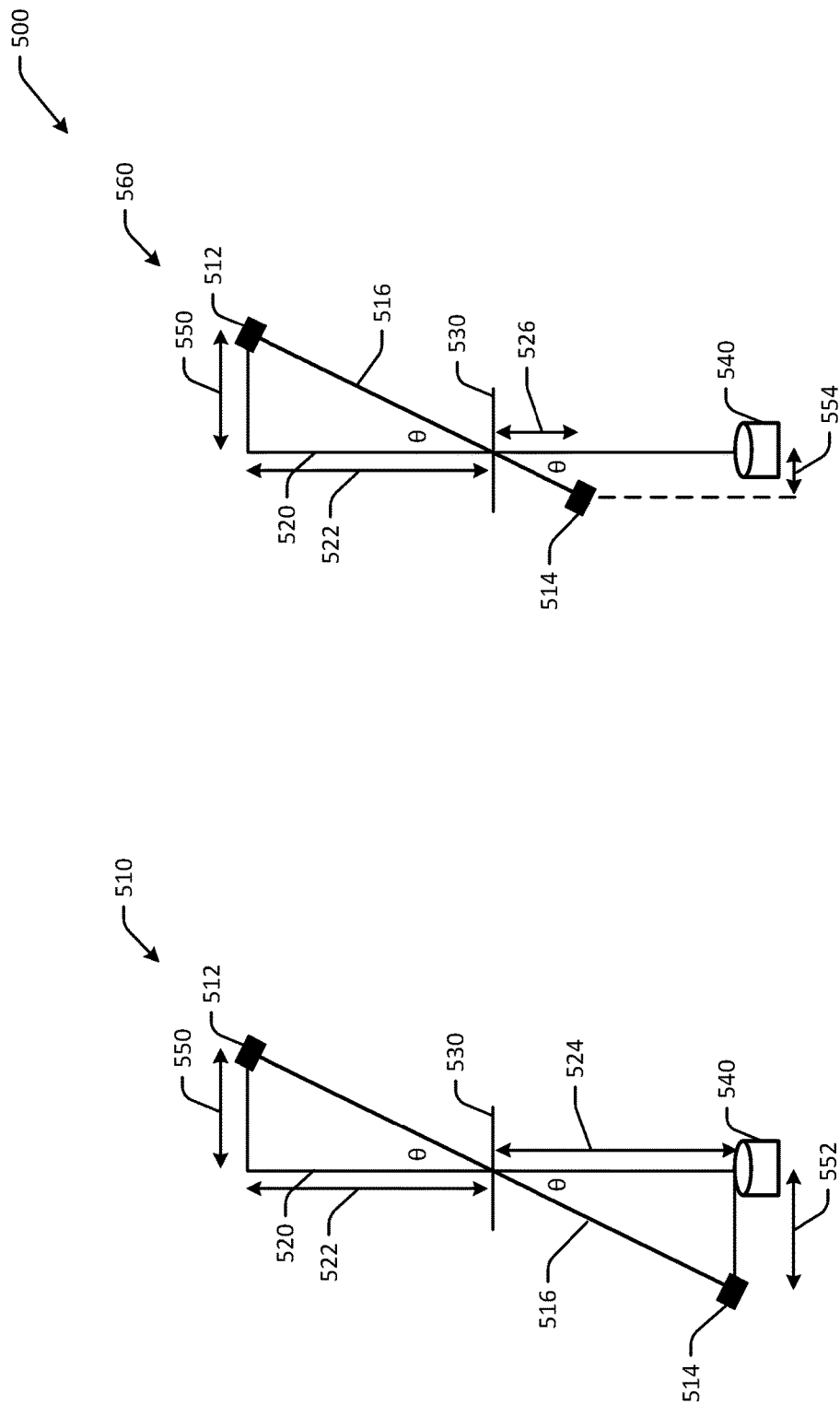
FIG. 5 is a schematic illustration of various error modifier calculation values in accordance with one or more embodiments of the disclosure.

FIG. 5 depicts schematic illustrations 500 of various error modifier calculation values in accordance with one or more embodiments of the disclosure. Other embodiments may include additional or fewer components. The illustration of FIG. 5 is not to scale, and may not be illustrated to scale with respect to other figures. The components illustrated in FIG. 5 may be the same components of the scanning and dimensioning items in motion system discussed with respect to FIGS. 1-4.

In FIG. 5, a first schematic illustration 510 depicts a schematic side view of a light emitting array 512 and a light receiving array 514 offset from a vertical axis 520 by an angle θ. The angle θ may be an angle of about 5 degrees, about 10 degrees, or another value. In the first schematic illustration 510, the light emitting array 512 and the light receiving array 514 may be equidistant from a gap 530, where the gap 530 is between two surfaces, such as two conveyors, one conveyor and a static surface, or two other surface types. In some embodiments, the light emitting array 512 may be disposed below the gap 530 and the light receiving array 514 may be disposed above the gap 530. The light emitting array 512 and the light receiving array 514 may be aligned along axis 516, such that the light receiving array 514 receives light output by the light emitting array 512.

The light emitting array 512 may be a vertical distance 522 from the gap 530, and a horizontal distance 550 from the vertical axis 520. Similarly, the light receiving array 514 may be positioned a vertical distance 524 from the gap 530 (which may be the same as distance 522), and a horizontal distance 552 from the vertical axis 520 (which may be the same as distance 550). One or more of the distance values 522, 524, 550, 552 and the angular value θ may be used to determine an error modifier for the system. The error modifier may change based on the particular configuration of the light emitting arrays, and may be a function of item height in some instances. For example, the error modifier may be equal to ((c*b)/d), where (c) is a distance from the lower light array from the vertical axis, and is multiplied by (b) which is an item height, and subsequently divided by (d) which is a distance between the lower camera and the gap 530. Other embodiments may determine error modifiers using an inverse tangent value of the offset distance divided by the vertical distance of the light emitting array from the gap (if disposed above the gap, or else the light receiving array if disposed above the gap).

One or more line scanning cameras 540 may be disposed below the gap 530 and may or may not be adjacent to the light receiving array 514. The line scanning camera 540 may be configured to scan machine readable codes on a bottom surface of an item as it passes over the gap 530.

A second schematic illustration 560 depicts a schematic side view of the light emitting array 512 and the light receiving array 514 offset from the vertical axis 520 by the angle θ, but where the light emitting array 512 and the light receiving array 514 are positioned at different or non-uniform vertical and horizontal distances from the gap 530 and the vertical axis 520, respectively. The angle θ may be an angle of about 5 degrees, about 10 degrees, or another value. In the second schematic illustration 560, the light emitting array 512 and the light receiving array 514 may be at non-uniform distances from the gap 530, where the gap 530 is between two surfaces, such as two conveyors, one conveyor and a static surface, or two other surface types. In some embodiments, the light emitting array 512 may be disposed below the gap 530 and the light receiving array 514 may be disposed above the gap 530. The light emitting array 512 and the light receiving array 514 may be aligned along axis 516, such that the light receiving array 514 receives light output by the light emitting array 512.

The light emitting array 512 may be a vertical distance 522 from the gap 530, and a horizontal distance 550 from the vertical axis 520. In contrast, the light receiving array 514 may be positioned a vertical distance 526 from the gap 530 (which may be different from the distance 522), and a horizontal distance 554 from the vertical axis 520 (which may different from the distance 550). One or more of the distance values 522, 526, 550, 554 and the angular value θ may be used to determine an error modifier for the system. The error modifier may change based on the particular configuration of the light emitting arrays, as well as an item height. For example, the error modifier may be equal to an inverse tangent value of the offset distance divided by the vertical distance of the light emitting array from the gap (if disposed above the gap, or else the light receiving array if disposed above the gap).

The one or more line scanning cameras 540 may be disposed below the gap 530 and may or may not be adjacent to the light receiving array 514. The line scanning camera 540 may be configured to scan machine readable codes on a bottom surface of an item as it passes over the gap 530.

To determine an item dimension as it passes over the gap 530, a controller in communication with the light emitting array 512 and/or the light receiving array may be configured to determine a length of time of light interruption between the light emitting array 512 and the light receiving array 514. The controller may determine an estimated first dimension value based at least in part on the length of time, and may determine an error modifier based at least in part on the offset from the vertical axis (e.g., the distance 550 or the angle θ, a first distance between the light emitting array 512 and the gap 530 (e.g., the distance 522), and a second distance between the light receiving array 514 and the gap 530 (e.g., the distance 524 or 526, etc.). The controller may determine the first dimension using the estimated first dimension value and the error modifier.

Figure 6:
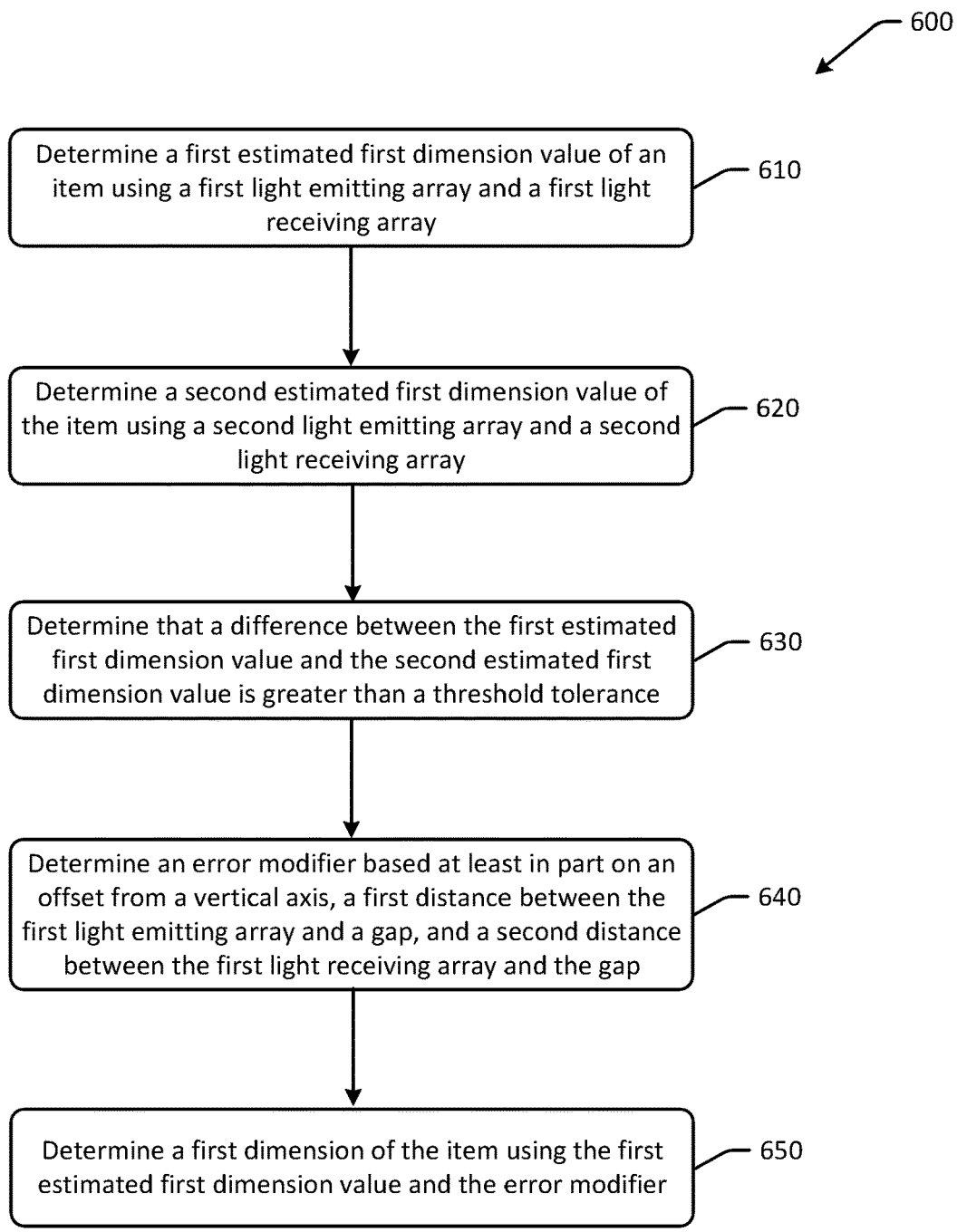
FIG. 6 is an example process flow for verification of dimension measurements in accordance with one or more embodiments of the disclosure.

FIG. 6 is an example process flow 600 for verification of dimension measurements in accordance with one or more embodiments of the disclosure. The process flow 600 may be performed by one or more computer systems, such as a controller coupled to one or more light array assemblies. One or more operations may be performed at least partially concurrently and/or in a different order than that depicted in the example of FIG. 6.

In some embodiments, more than one set of light emitting arrays and light receiving arrays may be used to determine item dimensions. For example, two pair of light emitting arrays and light receiving arrays may be used to determine the same item dimension, and if there is a threshold discrepancy or tolerance (e.g., a predetermined number of inches, such as 0.5 inches, etc.) between the determined values, a secondary analysis may be performed to verify and/or determine an accurate item dimension.

At block 610 of the process flow 600, a first estimated first dimension value of an item may be determined using a first light emitting array and a first light receiving array. The first light emitting array and the first light receiving array may be positioned so as to extend laterally across a gap between a first surface, such as a first conveyor, and a second surface, such as a second conveyor. The first light emitting array and the first light receiving array may extend across at least a portion of the width of the first surface and/or second surface. The gap (e.g., the spacing between the first and second surfaces, etc.) may have a width of less than about 1 inch, such as a width of 0.25 inches, so as to avoid creating a pinch point, safety hazard, or to otherwise avoid creating an obstacle for items as items move from the first surface to the second surface. The first light emitting array and the first light receiving array may be offset or rotated about a vertical axis, such that the first light emitting array and the first light receiving array are aligned and/or facing each other, but are not aligned in a vertical direction. The controller may determine the first estimated dimension value using the first light emitting array and the first light receiving array. For example, the controller may determine a length of time of light interruption between the light emitting array and the light receiving array. The light emitting array may be configured to output light, and the light receiving array may be configured to receive at least a portion of the light output by the light emitting array. As an item passes between the light emitting array and the light receiving array, the light may be interrupted and the light receiving array may not receive light emitted by the light emitting array. The length of time of light interruption may be used as a signal to determine a dimension of the item, such as a length of the item. For example, the amount or length of time the light was interrupted may be used in conjunction with a speed at which the item was moving to determine a length of the item. To determine the length of time of interruption, a controller in communication with the light receiving array may initiate a counter or timer after an interruption is detected, and may stop the counter or timer after the interruption ceases and/or the light receiving array receives light again. In some embodiments, an interruption may have a minimum length before a timer or counter is initiated, such as a number of milliseconds. The speed of the item may be determined using the speed of the first conveyor belt and/or the second conveyor belt as a proxy to determine a speed of the item at the time of the light interruption. The speed of the first conveyor belt or the second conveyor belt may be determined via communication with a conveyor controller, or may be a preset static value. The first conveyor belt and the second conveyor belt may move at the same speed in some instances. In an example embodiment, the controller may determine the speed of the first conveyor belt or the second conveyor belt by querying a conveyor system controller.

At block 620, a second estimated first dimension value of the item may be determined using a second light emitting array and a second light receiving array. The second light emitting array and the second light receiving array may be vertically oriented on sides of the gap or sides of the first surface and/or second surface. For example, the second light emitting array may be disposed upright along the vertical axis on a first side of the first surface, and the second light receiving array may be disposed upright along the vertical axis on a second side of the first surface. The second light emitting array and the second light receiving array may be aligned or facing each other, such that light output by the second light emitting array may be received by the second light receiving array. The controller may use the second light emitting array and the second light receiving array to determine a second estimated first dimension value. As a result, the controller may determine two estimated dimension values for the first item dimension, such as item length or width.

At block 630, it may be determined that a difference between the first estimated first dimension value and the second estimated first dimension value is greater than a threshold tolerance. For example, the controller may compare the first estimated first dimension value and the second estimated first dimension value to determine a difference. The difference may be compared to a threshold discrepancy or tolerance (e.g., a predetermined number of inches, such as 0.5 inches, 0.25 inches, etc.) to determine whether a secondary analysis is to be performed. The secondary analysis may include determining a corrected first estimated dimension value that accounts for the offset from vertical axis for the first light receiving array and the first light emitting array. In instances where the item is thin, such as a gift card, or the item has an odd shaped package, such as clamshell packaging, the second light emitting array and the second light receiving array may be unable to accurately determine the item dimension due to the thinness of at least a portion of the item as it passes between the arrays, and there may therefore be a discrepancy in the first estimated dimension value and the second estimated dimension value. Accordingly, if the controller determines that a difference between the first estimated first dimension value and the second estimated first dimension value is greater than the threshold tolerance, the controller may initiate a secondary analysis to verify and/or determine an accurate item dimension.

At block 640, an error modifier may be determined based at least in part on an offset from the vertical axis, a first distance between the first light emitting array and a gap between the first conveyor and the second conveyor, and a second distance between the light receiving array and the gap. For example, the light emitting array and the light receiving array may not be vertically aligned or aligned with a vertical axis. Instead, the light emitting array and the light receiving array may be offset from the vertical axis. In one example, the light emitting array and the light receiving array may be rotated from the vertical axis by an angular value of about 4 degrees, or about 5 degrees, or about 6 degrees, or about 7 degrees, or about 10 degrees, or about 15 degrees. The angular value may be the offset from the vertical axis, and the actual distance between the vertical axis and the light emitting array and/or the light receiving array may be a horizontal distance of about 2 inches or a different distance. The first distance may be the distance between the light emitting array and a gap between the first conveyor and the second conveyor. The second distance may be the distance between the light receiving array and the gap. The first distance and the second distance may be non-equal or different. The offset, the first distance, and the second distance may be static values and may be input at the controller or otherwise detected by the controller during use. The error modifier may account for a discrepancy in dimensional measurement detected using the light emitting array and the light receiving array due to the offset from the vertical axis. For example, detected measurements may be slightly larger than actual values due to the offset. To determine the error modifier, in one example, the controller may determine an inverse tangent value of the offset distance divided by the vertical distance of the light emitting array from the gap (if disposed above the gap, or else the light receiving array if disposed above the gap). The error modifier may be a fixed adjustment value, such as, in one example, minus 1 inch for an offset of 7 degree rotation from the vertical axis. In other embodiments, the error modifier could be a positive fixed adjustment value.

At block 650, a first dimension of the item may be determined using the estimated first dimension value and the error modifier. For example, if the estimated first dimension value is 6 inches, and the error modifier is −1 inch, the controller may determine the first dimension of the item to be 5 inches.

Accordingly, the first dimension of the item may be accurately determined as the item passes in motion over a gap between the first conveyor and the second conveyor, or other first surface and second surface, using the process flow 600. One or more cameras, such as barcode scanning cameras, may be disposed about the gap, including underneath the gap, and can be used to identify the item, such as by scanning or otherwise visualizing a machine-readable code on the item. The process flow 600 may therefore be executed to accurately scan and dimension items in motion.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
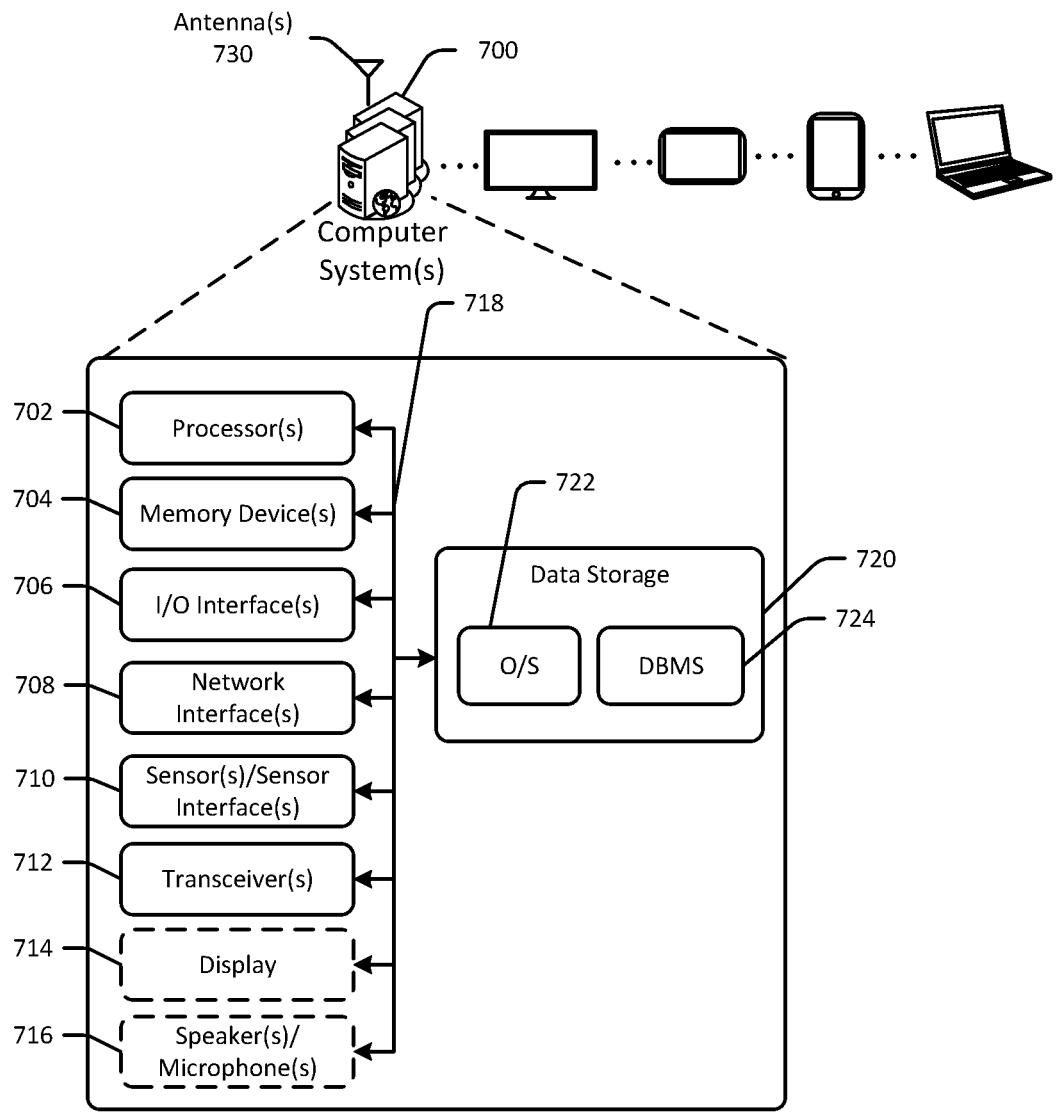
FIG. 7 schematically illustrates an example architecture of a computer system associated with a system for scanning and dimensioning items in motion in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for the device(s) of FIGS. 1-6. For example, the computer system(s) 700 may control one or more aspects of the scanning and dimensioning items in motion systems described in FIGS. 1-6.

The computer system(s) 700 may be configured to communicate with one or more servers, user devices, or the like. The computer system(s) 700 may be configured to identify items, dimension items, retrieve items, move items, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antennas may include directional antennas, non-directional antennas, dipole antennas, folded dipole antennas, patch antennas, multiple-input multiple-output (MIMO) antennas, or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system to identify an item and measure a first dimension of the item, the system comprising:
    a first conveyor belt configured to transport the item;
    a second conveyor belt separated from the first conveyor belt and configured the item from the first conveyor belt;
    a gap between the first conveyor belt and the second conveyor belt, the gap having a width of less than or equal to one inch;
    a first set of cameras configured to image an upper portion of the item, a front face of the item, and a rear face of the item;
    a second set of cameras configured to image a first side of the item, the second set of cameras disposed about a first side of the first conveyor belt or the second conveyor belt;
    a third set of cameras configured to image a second side of the item, the third set of cameras disposed about a second side of the first conveyor belt or the second conveyor belt;
    a fourth set of cameras configured to image a lower portion of the item, the fourth set of cameras disposed below the gap;
    a light emitting array positioned across a length of the gap, wherein the light emitting array is disposed adjacent to the first set of cameras; and
    a light receiving array positioned across the length of the gap, wherein the light receiving array is disposed adjacent to the fourth set of cameras, such that light emitted by the light emitting array propagates through the gap and is received by the light receiving array;
    wherein the light emitting array and the light receiving array are offset from a vertical axis by about 5 degrees; and
    wherein the system is configured to identify the item by scanning a barcode using one or more of the first set of cameras, the second set of cameras, the third set of cameras, or the fourth set of cameras, and wherein the system is configured to measure the first dimension of the item using the light emitting array and the light receiving array.

2. The system of claim 1, further comprising:
    a controller configured to:
        determine a length of time of light interruption between the light emitting array and the light receiving array;
        determine a speed of the first conveyor belt or the second conveyor belt;
        determine an estimated first dimension value based at least in part on the length of time and the speed;
        determine an error modifier based at least in part on the offset from the vertical axis, a first distance between the light emitting array and the gap, and a second distance between the light receiving array and the gap; and
        determine the first dimension using the estimated first dimension value and the error modifier.

3. The system of claim 1, further comprising:
    a vertical light emitting array positioned adjacent to the first side of the first conveyor belt or the second conveyor belt; and
    a vertical light receiving array positioned adjacent to the second side of the first conveyor belt or the second conveyor belt;
    wherein the vertical light emitting array and the vertical light receiving array are configured to determine a height of the item, and wherein the first dimension is a length of the item.

4. The system of claim 1, wherein a first distance between the light emitting array and the gap is greater than a second distance between the light receiving array and the gap.

5. A system comprising:
    a first camera oriented along a vertical axis towards a gap between a first surface and a second surface;
    a first light emitting array positioned to emit light towards the gap; and
    a first light receiving array aligned with the light emitting array and configured to detect the light;
    wherein the first light emitting array and the first light receiving array are offset from the vertical axis, and wherein the system is configured to determine a first dimension of an item passing over the gap using the first light emitting array and the first light receiving array.

6. The system of claim 5, further comprising:
a controller configured to:
    determine a length of time of light interruption between the first light emitting array and the first light receiving array;
    determine an estimated first dimension value based at least in part on the length of time;
    determine an error modifier based at least in part on the offset from the vertical axis, a first distance between the first light emitting array and the gap, and a second distance between the first light receiving array and the gap; and
    determine the first dimension using the estimated first dimension value and the error modifier.

7. The system of claim 5, further comprising:
a second light emitting array oriented along the vertical axis; and
a second light receiving array oriented along the vertical axis and configured to receive light emitted from the second light emitting array;
wherein the second light emitting array and the second light receiving array are configured to determine a height of the item, and wherein the first dimension is a length of the item.

8. The system of claim 7, further comprising:
a controller configured to:
    determine a first estimated first dimension value determined using the first light emitting array and the first light receiving array;
    determine a second estimated first dimension value determined using the second light emitting array and the second light receiving array;
    determine that a difference between the first estimated first dimension value and the second estimated first dimension value is greater than a threshold tolerance;
    determine an error modifier based at least in part on the offset from the vertical axis, a first distance between the first light emitting array and the gap, and a second distance between the first light receiving array and the gap; and
    determine the first dimension using the first estimated first dimension value and the error modifier.

9. The system of claim 5, wherein the first light emitting array is disposed a first distance from the gap, and the first light receiving array is disposed a second distance from the gap.

10. The system of claim 5, wherein the first light emitting array is coupled to the first light receiving array via a U-shaped bracket.

11. The system of claim 5, wherein the first light emitting array is coupled to the first light receiving array via a rectangular bracket.

12. The system of claim 5, wherein the first light emitting array is disposed on an upper side of the gap, and the first light receiving array is disposed on a lower side of the gap.

13. The system of claim 5, wherein the first camera is disposed on a lower side of the gap.

14. The system of claim 5, wherein the first light emitting array is offset by about 5 degrees from the vertical axis.

15. The system of claim 5, further comprising:
a second camera disposed along an upper portion of the first surface;
a third camera disposed along a first side of the first surface; and
a fourth camera disposed along a second side of the first surface.

16. A system comprising:
a first camera oriented along a vertical axis towards a gap between a first surface and a second surface;
a first light emitting array positioned to emit light towards the gap;
a first light receiving array aligned with the light emitting array and configured to detect the light, wherein the first light emitting array and the first light receiving array are offset from the vertical axis;
a second light emitting array oriented along the vertical axis; and
a second light receiving array oriented along the vertical axis and configured to receive light emitted from the second light emitting array;
wherein the system is configured to determine a length of an item passing over the gap using the first light emitting array and the first light receiving array, and wherein the second light emitting array and the second light receiving array are configured to determine a height of the item.

17. The system of claim 16, further comprising:
a controller configured to:
    determine a first estimated length value determined using the first light emitting array and the first light receiving array;
    determine a second estimated length value determined using the second light emitting array and the second light receiving array;
    determine that a difference between the first estimated length value and the second estimated length value is greater than a threshold tolerance;
    determine an error modifier based at least in part on the offset from the vertical axis, a first distance between the first light emitting array and the gap, and a second distance between the first light receiving array and the gap; and
    determine the length using the first estimated length value and the error modifier.

18. The system of claim 16, wherein the first light emitting array is disposed a first distance from the gap, and the first light receiving array is disposed a second distance from the gap.

19. The system of claim 16, wherein the first camera is disposed on a lower side of the gap.

20. The system of claim 16, wherein the first light emitting array is coupled to the first light receiving array via a rectangular bracket.

* * * * *